(12) United States Patent
Shim et al.

(10) Patent No.: US 7,782,740 B2
(45) Date of Patent: *Aug. 24, 2010

(54) OPTICAL DISC HAVING SMALL ACCESS UNITS AND ADDRESS INFORMATION MODULATION METHOD THEREFOR

(75) Inventors: Jae-seong Shim, Seoul (KR); Kyung-geun Lee, Gyeonggi-do (KR); In-sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1030 days.

This patent is subject to a terminal disclaimer.

(21) Appl. No.: 11/511,345

(22) Filed: Aug. 29, 2006

(65) Prior Publication Data

US 2006/0291337 A1 Dec. 28, 2006

Related U.S. Application Data

(63) Continuation of application No. 10/418,140, filed on Apr. 18, 2003, now Pat. No. 7,167,437.

(30) Foreign Application Priority Data

May 17, 2002 (KR) ................................ 2002-27343

(51) Int. Cl.
*G11B 5/09* (2006.01)
(52) U.S. Cl. .................... 369/124.04; 369/124.07; 369/59.23; 369/47.19
(58) Field of Classification Search .......... None
See application file for complete search history.

(56) References Cited

U.S. PATENT DOCUMENTS

| 6,671,238 B1 | 12/2003 | Ko et al. |
| 6,744,718 B1 | 6/2004 | Ko et al. |

(Continued)

FOREIGN PATENT DOCUMENTS

| EP | 1 255 245 | 11/2002 |
| JP | 7-014173 | 1/1995 |
| JP | 2001-143272 | 5/2001 |
| JP | 2001-143273 | 5/2001 |

(Continued)

OTHER PUBLICATIONS

Minamino, et al. "Practical Study of Saw-tooth Wobble Addressing by Theoretical and Experimental Approaches" *Jpn. J. Appl. Phys.*, vol. 41(2002) pp. 1741-1742.

(Continued)

*Primary Examiner*—Muhammad N. Edun
(74) *Attorney, Agent, or Firm*—NSIP Law

(57) ABSTRACT

An address information modulation method includes using a first characteristic of a first modulation method and a second characteristic of a second modulation method to modulate address information and/or additional information. Accordingly, a data amount of information, to access a disc, in a predetermined space of the disc is increased, and the modulated information is formed in a form of a wobble signal in a track. Here, the first characteristic of the first modulation method can be physical location information of an MSK-modulated signal, and the second characteristic of the second modulation method can be sign information of a second harmonic wave obtained by an HMW modulation, which synthesizes a cosine function of a basic frequency of a wobble signal with a sine function having a frequency that is a multiple of the basic frequency of the wobble signal. Therefore, where the address information is modulated, a plurality of information bits are loaded on a predetermined number of wobble or carrier signals to increase the amount of the information in the predetermined space, such that a physical length of the information needed in accessing the disc and reading the additional information thereof is shortened. Also, where a defect occurs, the resulting loss can be reduced such that addressing specifications for a small-sized high density disc can be satisfied.

18 Claims, 3 Drawing Sheets

U.S. PATENT DOCUMENTS

| | | |
|---|---|---|
| 6,791,920 B1 | 9/2004 | Ko et al. |
| 6,813,230 B1 | 11/2004 | Ko et al. |
| 6,952,381 B2 | 10/2005 | Schep et al. |
| 7,065,015 B2 | 6/2006 | Lee et al. |
| 7,079,477 B2 | 7/2006 | Moriya et al. |
| 7,167,437 B2 * | 1/2007 | Shim et al. ............... 369/275.4 |
| 2002/0110067 A1 | 8/2002 | Kondo et al. |
| 2002/0172122 A1 | 11/2002 | Choi et al. |
| 2003/0002427 A1 | 1/2003 | Lee et al. |
| 2003/0048725 A1 | 3/2003 | Lee et al. |
| 2003/0048730 A1 | 3/2003 | Nakamura et al. |
| 2003/0179689 A1 | 9/2003 | Lee et al. |
| 2004/0156291 A1 | 8/2004 | Heemskerk et al. |
| 2004/0174800 A1 | 9/2004 | Heemskerk et al. |
| 2006/0146674 A1 | 7/2006 | Nakamura et al. |

FOREIGN PATENT DOCUMENTS

| | | |
|---|---|---|
| JP | 2001-167445 | 6/2001 |
| JP | 2001-167446 | 6/2001 |
| JP | 2003-123267 | 4/2003 |
| KR | 2001-49238 | 6/2001 |
| KR | 2001-49239 | 6/2001 |
| WO | WO 02/19332 | 3/2002 |
| WO | WO 02/29790 | 4/2002 |
| WO | WO 03/034414 | 4/2003 |

OTHER PUBLICATIONS

Park, et al. "A New Physical Address Decoder for the Blu-ray Disc System using Digital Hybrid Demodulation Techniques" IEEE 2002 0-7803-7379-0/02.

Search Report issued in European Patent Application No. 03708707.9 on Aug. 22, 2006.

U.S. Appl. No. 10/418,140, filed Apr. 18, 2003, Jae-seong Shim, et al., Samsung Electronics Co., Ltd.

Office Action issued in Japanese Patent Application No. 2004-506017 on Oct. 23, 2007.

* cited by examiner

OPTICAL DISC HAVING SMALL ACCESS UNITS AND ADDRESS INFORMATION MODULATION METHOD THEREFOR

CROSS-REFERENCE TO RELATED APPLICATIONS

This application is a continuation of U.S. patent application Ser. No. 10/418,140, filed Apr. 18, 2003, now U.S. Pat. No. 7,167,437, which claims the benefit of Korean Patent Application No. 2002-27343, filed May 17, 2002, in the Korean Intellectual Property Office, the disclosures of which are incorporated herein by reference.

BACKGROUND OF THE INVENTION

1. Field of the Invention

The present invention relates to a high density optical disc, and more particularly, to an optical disc having address information recorded thereon so as to access the information in small units, and an address information modulation method thereof.

2. Description of the Related Art

Currently, optical discs having a high recording density and a high accessing speed are being developed to meet the computer and consumer electronics needs. Generally, desired specifications of a high density (HD) digital versatile disc (DVD) having a capacity of 23 GB or more and using a blue laser beam, include a 405 nm wavelength, a 0.85 numerical aperture (NA), a 12 cm diameter, and a 0.1 mm cover layer thickness. In the HD DVD, development trends show that an error correction unit may increase to 64 KB to increase an error correction capability thereof. In addition, in a next-generation optical disc recording/reproducing apparatus having a capacity of 23 GB or more and using a blue laser beam, a minimum shift keying (MSK) modulation method or a harmonic modulated wave (HMW) modulation method is available as a method to form tracks on a disc. That is, using the MSK or HMW modulation method, physical address information for accessing the disc is modulated into a wobble signal, and tracks are formed on the disc. Accordingly, the disc can be accessed using the address information obtained by demodulating the wobble signal reproduced from a track signal.

FIG. 1 illustrates a conventional method of forming address information and additional information in tracks on a disc. As shown in FIG. 1, physical address information 11, for accessing the disc, and other additional information 12 are modulated together 13 by a predetermined modulation method 14, and the modulated signal is formed in a track on the disc 15. Here, the modulation method may be an MSK or HMW modulation method. According to information contents of the address information or other additional information, a carrier signal is MSK or HMW modulated, and the modulated carrier signal is formed in a track on the disc. The track on the disc has the same shape as the modulated carrier signal and is referred to as a wobble signal.

However, the information contents of the address information or other additional information are MSK or HMW modulated in units of 1 bit into a predetermined number of carrier signals, and the modulated carrier signals are formed in tracks on the disc. To read this information from the disc, an MSK or HMW demodulation is performed using a predetermined number of wobble signals such that 1-bit-long address information or other information is obtained. Thus, according to the related art, 1-bit address information or other additional information is expressed by a predetermined number of wobble or carrier signals, and therefore, a physical address unit of the disc becomes large. Accordingly, the related art method may not be appropriate, for example, for a small-sized disc for mobile communications. Also, where a defect occurs in a small-sized disc utilizing the method above, the same loss as the size of an access unit occurs. Therefore, the smaller the size of an access unit, the more advantageous the access unit.

SUMMARY OF THE INVENTION

Accordingly, it is an aspect of the present invention to provide an optical disc on which address information is formed so that information can be accessed in small units that are appropriate for a small-sized disc, for example, a disc for mobile communications, and an address information modulation method thereof.

Another aspect of the present invention is to provide an optical disc on which address information is formed in a track of a wobble signal so that information can be accessed in small units that comply with address standards for a small-sized disc using a blue laser beam, and an address information modulation method thereof.

Yet another aspect of the present invention is to provide an optical disc on which a plurality of bits of address information or other additional information are expressed by a predetermined number of wobble signals or carrier signals such that the amount of information in a predetermined space increases and an arbitrary location on the disc can be minutely accessed, and an address information modulation method thereof.

Additional objects and advantages of the invention will be set forth in part in the description which follows and, in part, will be obvious from the description, or may be learned by practice of the invention.

To achieve the above and/or other aspects of the present invention, there is provided an optical disc comprising tracks and wobble signals which form the tracks. The wobbles signals include other information to access the optical disc, and by using a first characteristic of a first modulation method and a second characteristic of a second modulation method, address information of the other information and/or additional information of the other information is modulated to increase a data amount of the other information in a predetermined space of the optical disc. The modulated information is in a form of a wobble signal in one of the tracks.

The first characteristic of the first modulation method may be physical location information of an MSK-modulated signal, and the second characteristic of the second modulation method may be sign information of a second harmonic wave obtained by an HMW modulation method which synthesizes a cosine function of a basic frequency of the wobble signal with a sine function having a frequency that is a multiple of the basic frequency of the wobble signal.

To achieve the above and/or other aspects of the present invention, there is provided another optical disc comprising tracks and wobbles signals which form the tracks. The wobble signals include other information to access the optical disc, and by using at least two different modulation methods, address and/or additional information of the other information are modulated into a predetermined number of carrier signals so as to express a plurality of information bits in a basic unit that expresses the other information. The modulated carrier signals are formed as wobble signals in the tracks so as to access an arbitrary location on the disc in small units and/or increase an amount of the address and/or additional information in a predetermined space of the optical disc.

The at least two or more modulation methods include an MSK modulation method and an HMW modulation method, and by using location information of the MSK modulation method and sign information of a second harmonic of the HMW modulation method, the information bits may be expressed in the basic unit so as to increase an amount of the other information in a predetermined space of the optical disc.

To achieve the above and/or other aspects of the present invention, there is provided an address information modulation method for modulating address and/or additional information of other information to access a disc, the method comprising by using a first characteristic of a first modulation method and a second characteristic of a second modulation method, modulating the address information and/or the additional information to increase a data amount of the other information in a predetermined space of the disc, and forming the modulated information in a form of a wobble signal in a track of the disc so as to access an arbitrary location of the disc in small units and/or increase an amount of the address information and/or the additional information in a predetermined space of the disc.

The using of the first characteristic of the first modulation method may include using physical location information of an MSK-modulated signal, and the using of the second characteristic of the second modulation method may include using sign information of a second harmonic wave obtained by an HMW modulation method which synthesizes a cosine function of a basic frequency of the wobble signal with a sine function having a frequency that is a multiple of the basic frequency of the wobble signal.

To achieve the above and/or other aspects of the present invention, there is provided another address information modulation method for modulating address and/or additional information of other information to access a disc, the method comprising by using at least two or more different modulation methods, modulating the address and/or additional information into a predetermined number of carrier signals so as to express a plurality of information bits in a basic unit that expresses the other information, and forming the modulated carrier signals as wobble signals in tracks of the disc so as to access an arbitrary location on the disc in small units and/or increase an amount of the address and/or additional information in a predetermined space of the disc.

The using of the at least two or more modulation methods includes using at least an MSK modulation method and an HMW modulation method, and the using of the at least the MSK and HMW modulation methods includes using location information of the MSK modulation method and sign information of a second harmonic of the HMW modulation method to express the information bits in the basic unit so as to increase an amount of the other information in a predetermined space of the disc.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
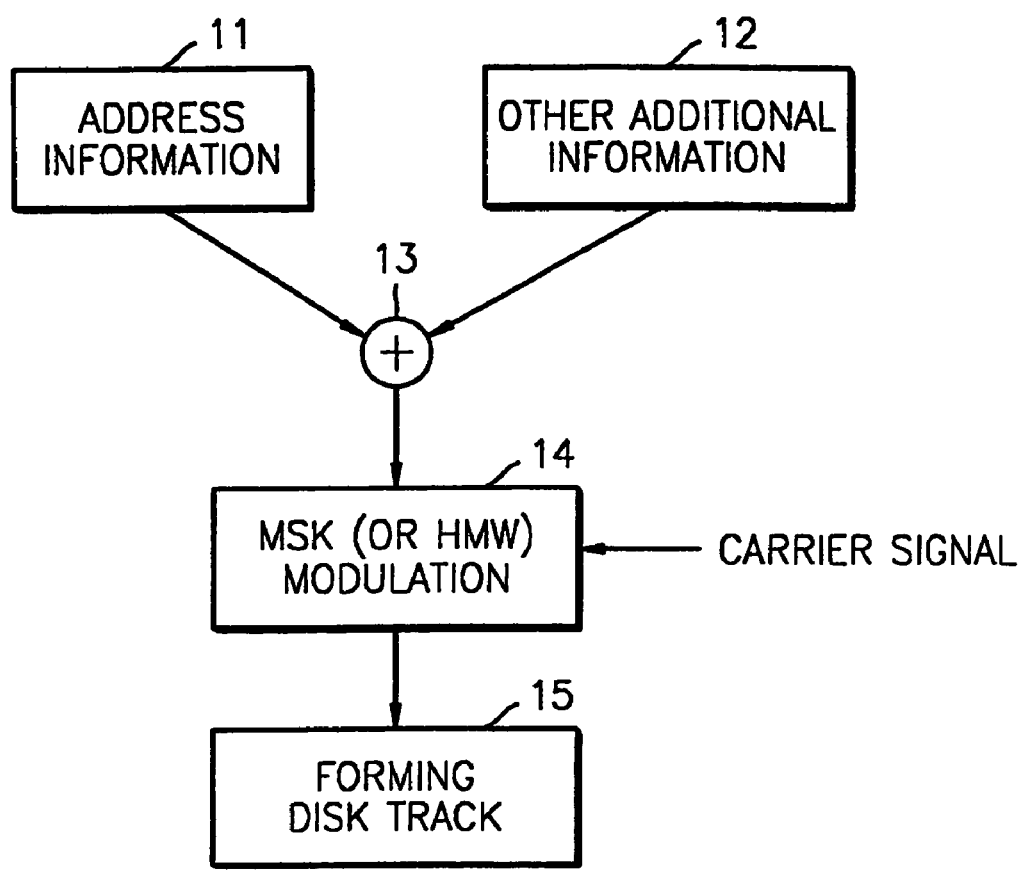
FIG. 1 is a schematic diagram illustrating a conventional method of recording address information and additional information on a disc track.

Reference will now be made in detail to the embodiments of the present invention, examples of which are illustrated in the accompanying drawings, wherein like reference numerals refer to the like elements throughout. The embodiments are described below in order to explain the present invention by referring to the figures.

In the present invention, address information and other additional information may be formed in tracks on a disc through the method shown in FIG. 1. To modulate the address information and other additional information, both MSK and HMW modulation methods may be used. However, unlike in the conventional art in which 1-bit-long information is loaded on a predetermined number of wobble or carrier signals, in the present invention, a plurality of information bits are loaded on a predetermined number of wobble or carrier signals to increase the amount of information in a predetermined space of a disc, such that a physical length of the information needed in accessing the disc and reading additional information thereof is shortened. Accordingly, even where a defect occurs, the resulting loss can be reduced.

Since the MSK modulation method and the HMW modulation method are well-known in the art, the methods will be explained briefly. In the MSK modulation, one MSK mark is expressed by arranging, for example, a plus (+) cosine function and a minus (−) cosine function at both sides of a cosine function of a basic frequency of a wobble, in which both side cosine functions each have a frequency 1.5 times the basic frequency. In the HMW modulation, a cosine function of a basic frequency of a wobble and a sine function of a frequency that is a multiple of the basic frequency are synthesized, and the sign of a second harmonic indicates a bit value. Sign "+" indicates 1 and sign "−" indicates 0. According to these signs, a slant of a right-hand side or left-hand side is determined such that a sawtooth-shape signal is generated. The sawtooth-shape signal is also referred to as a sawtooth wobble (STW). In the present invention, where the sign is "+", it will be referred to as "+STW", and where the sign is "−" it will be referred to as "−STW".

An operation of using the MSK and HMW modulation methods to increase the amount of information in a predetermined space, so as to access the information in small units, and an embodiment to express a plurality of bits of data with a predetermined number of wobble signals will now be explained.

Figure 2:
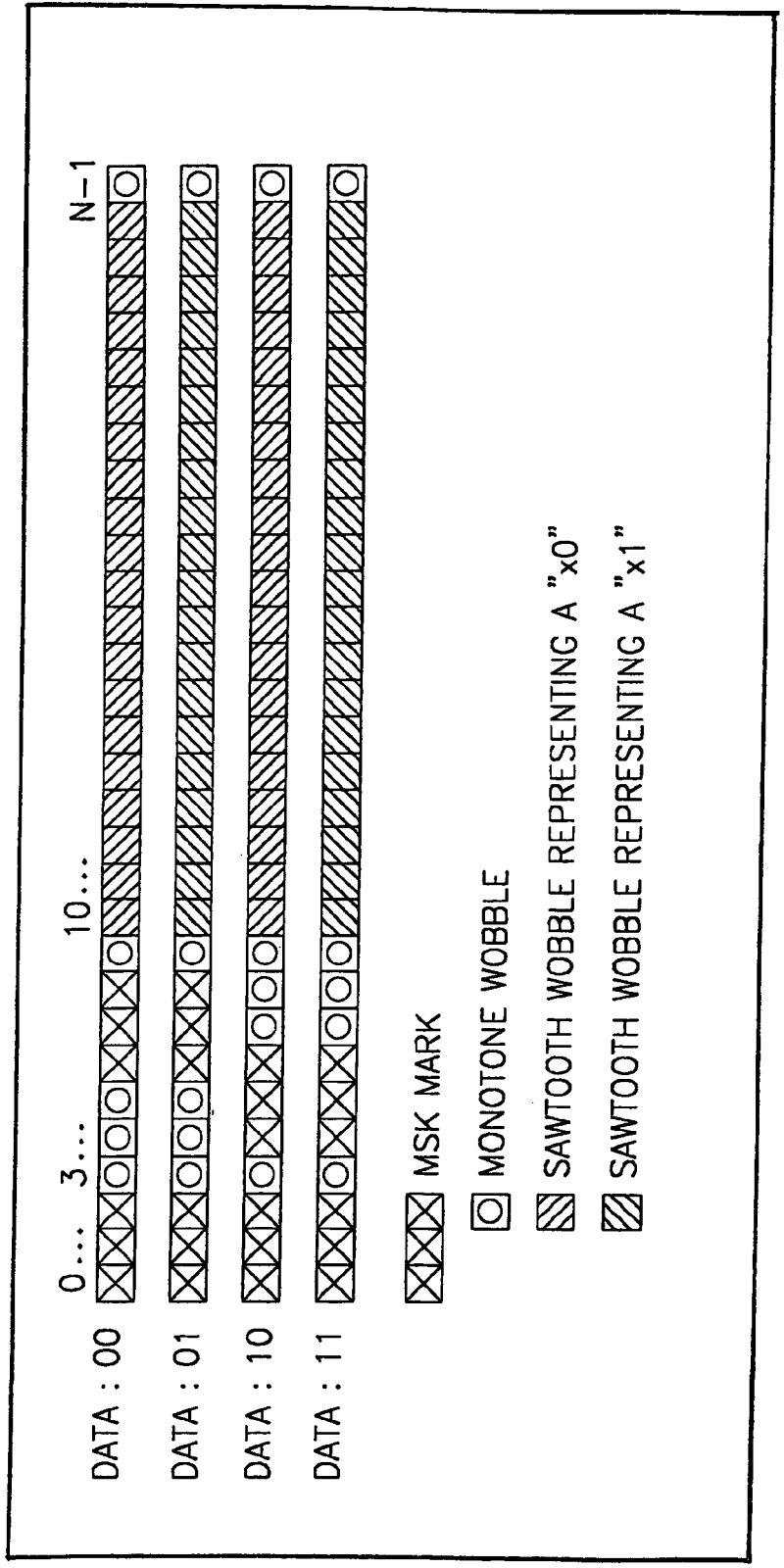
FIG. 2 is a diagram illustrating an address information modulation method according to an embodiment of the present invention.

FIG. 2 shows a diagram illustrating an address information modulation method according to an embodiment of the present invention, in which a first bit of each two data bits is expressed by MSK locations and a second bit is expressed by the sign of STW (+STW or −STW). Where the MSK locations are in order of 1 MSK Mark (MM), 3 monotone wobbles (MWs), 1 MM, and 1 MW, the first bit represents "0x", and where the MSK locations are in order of 1MM, 1MM, and 3MWs, the first bit represents "1x". Where a sawtooth wobble (STW) slants to the right as a result of the HMW modulation, the second bit represents "x0", and where it slants to the left, the second bit represents "x1".

In tracks on a disc, there are basic units, where each basic unit is formed with an N (here, for example, N is 31) nominal wobble length (NWL) that can express information, and the basic units are modulated by mixing the MSK and HMW modulation methods. In the conventional art, only 1-bit-long information is loaded in a basic unit. However, in the present invention, a plurality of information bits can be loaded in a basic unit. Two bits data "00" loaded in a basic unit according to an embodiment of the present invention are represented by 1 MM followed by 3 MWs, 1 MM, 1 MW, 20 −STW's, and 1 MW. Data "01" are represented by 1 MM followed by 3 MWs, 1 MM, 1 MW, 20 +STW's, and 1 MW. Data "10" are represented by 1 MM followed by 1 MW, 1 MM, 3 MWs, 20 −STW's, and 1 MW. Data "11" are represented by 1 MM followed by 1 MW, 1 MM, 3 MWs, 20 +STW's, and 1 MW.

Figure 3:
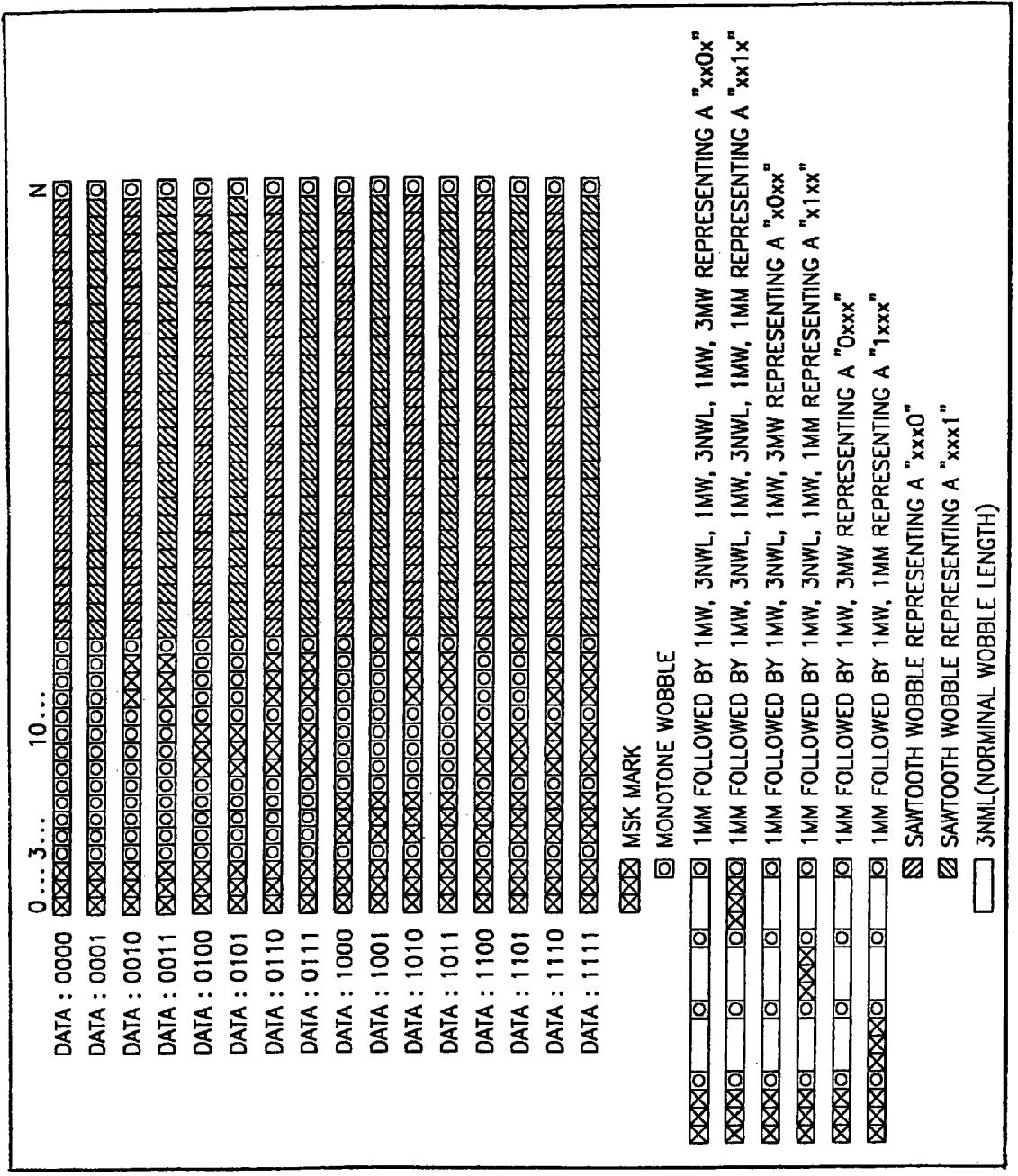
FIG. 3 is a diagram illustrating an address information modulation method according to another embodiment of the present invention.

FIG. 3 shows a diagram illustrating an address information modulation method according to another embodiment of the present invention. In this embodiment, to express 4-bits-long data in a basic unit with a predetermined number of wobbles, the first 3 bits of the 4 bits are expressed by the presence of 3 MSK marks, and the last bit is expressed by the sign of STW (+STW or −STW).

That is, where 1 MM is followed by 1 MW, 3 nominal wobble lengths (NWLs), 1 MW, 3 NWLs, 1 MW, and 3 MWs, it represents "xx0x", where 1 MM is followed by 1 MW, 3 NWLs, 1 MW, 3 NWLs, 1 MW, and 1 MM, it represents "xx1x", where 1 MM is followed by 1 MW, 3 NWLs, 1 MW, and 3 MWs, it represents "x0xx", where 1 MM is followed by 1 MW, 3 NWLs, 1 MW, and 1 MM, it represents "x1xx", where 1 MM is followed by 1 MW and 3 MWs, it represents "0xxx", and where 1 MM is followed by 1 MW and 1 MM, it represents "1xxx". Where a sawtooth wobble slants to the right as a result of the HMW modulation after the MSK modulation in the basic unit, it represents "xxx0", and where it slants to the left, it represents "xxx1".

In tracks on a disc according to the embodiment shown in FIG. 3, a basic unit is formed with an N (here, for example, N is 42) NWL and the basic units are modulated by mixing the MSK and HMW modulation methods. Data "0000" loaded in a basic unit are represented by 1 MM followed by 13 MWs, 25-STW's, and 1 MW. Data "0001" are represented by 1 MM followed by 13 MWs, 25 +STWs, and 1 MW. Data "0010" are represented by 1 MM followed by 9 MWs, 1 MM, 1 MW, 25-STW's, and 1 MW. Data "0011" are represented by 1 MM followed by 9 MWs, 1 MM, 1 MW, 25 +STW's, and 1 MW. Data "0100" are represented by 1 MM followed by 5 MWs, 1 MM, 5 MWs, 25-STW's, and 1 MW. Data "0101" are represented by 1 MM followed by 5 MWs, 1 MM, 5 MWs, 25 +STW's, and 1 MW. Data "0110" are represented by 1 MM followed by 5 MWs, 1 MM, 1 MW, 1 MM, 1 MW, 25-STW's, and 1 MW. Data "0111" are represented by 1 MM followed by 5 MWs, 1 MM, 1 MW, 1 MM, 1 MW, 25 +STW's, and 1 MW. Data "1000" are represented by 1 MM followed by 1 MW, 1 MM, 9 MWs, 25 −STW's, and 1 MW. Data "1001" are represented by 1 MM followed by 1 MW, 1 MM, 9 MWs, 25 +STW's, and 1 MW. Data "1010" are represented by 1 MM followed by 1 MW, 1 MM, 5 MWs, 1 MM, 1 MW, 25 −STW's, and 1 MW. Data "1011" are represented by 1 MM followed by 1 MW, 1 MM, 5 MWs, 1 MM, 1 MW, 25 +STW's, and 1 MW. Data "1100" are represented by 1 MM followed by 1 MW, 1 MM, 1 MW, 1 MM, 5 MWs, 25 −STW's, and 1 MW. Data "1101" are represented by 1 MM followed by 1 MW, 1 MM, 1 MW, 1 MM, 5 MWs, 1 MW, 25 +STW's, and 1 MW. Data "1110" are represented by 1 MM followed by 1 MW, 1 MM, 1 MW, 1 MM, 1 MW, 1 MM, 1 MW 25 −STW's, and 1 MW. Data "1111" are represented by 1 MM followed by 1 MW, 1 MM, 1 MW, 1 MM, 1 MW, 1 MM, 25 +STW's, and 1 MW.

The present invention can be applied to increase the amount of additional data information as well as address information.

As described above, the amount of address information that can be expressed by a predetermined number of wobble signals increases such that information needed in accessing a disc can be expressed with a shorter physical length. Accordingly, since the physical length of the information needed to access the disc is shortened, addressing specifications for a small-sized disc using a blue laser beam can be satisfied, and even where a defect occurs, the resulting loss can be minimized.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An address information modulation method for modulating address information and/or additional information to access a disc, the method comprising:

by using a first characteristic of a first modulation method and a second characteristic of a second modulation method, modulating address information and/or additional information to express a plurality of information bits in a basic unit that expresses information; and forming the modulated information in a form of a wobble signal in a track of the disc so as to access an arbitrary location of the disc using smaller units and/or increase an amount of the address information and/or the additional information in a predetermined space of the disc.

2. The address information modulation method as claimed in claim 1, wherein the using of the first characteristic of the first modulation method includes using a first characteristic of a minimum shift keying (MSK) modulation method.

3. The address information modulation method as claimed in claim 1, wherein the using of the second characteristic of the second modulation method includes using a second characteristic of a harmonic modulated wave (HMW) modulation method.

4. The address information modulation method as claimed in claim 1, wherein the using of the first characteristic of the first modulation method includes using physical location information of a minimum shift keying (MSK)-modulated signal.

5. The address information modulation method as claimed in claim 1, wherein the using of the second characteristic of the second modulation method includes using sign information of a second harmonic wave obtained by a harmonic modulated wave (HMW) modulation method which synthesizes a cosine function of a basic frequency of the wobble signal with a sine function having a frequency that is a multiple of the basic frequency of the wobble signal.

6. An apparatus for modulating address information and/or additional information to access a disc, the apparatus comprising:

a modulator provided with at least two or more different modulation methods, to modulate address information and/or additional information in basic units into a predetermined number of carrier signals in which each basic unit is formed with a predetermined nominal wobble length (NWL) to express information, and a plurality of information bits are loaded in a basic unit that expresses the information; and means for forming the modulated information as wobble signals in tracks of the disc.

7. The apparatus as claimed in claim 6, wherein the two or more modulation methods include minimum shift keying (MSK) modulation and harmonic modulated wave (HMW) modulation methods.

8. The apparatus as claimed in claim 6, wherein the modulated information is in the form of the wobble signals in one of the tracks so as to access information on the optical disc in smaller units.

9. The apparatus as claimed in claim 6, wherein the modulated information is formed as the wobble signals in the tracks so as to increase an amount of the address information and/or additional information in a predetermined space of the disc, and/or access an arbitrary location of the disc using smaller data units.

10. The apparatus as claimed in claim 6, wherein the address information and/or additional information are modulated so as to decrease a physical length of information to access the disc.

11. The apparatus as claimed in claim 6, wherein the address information and/or additional information are modulated in the basic units into a predetermined number of wobble signals such that an arbitrary location on the disc is accessed in the basic units.

12. An apparatus for forming tracks on an optical disc, the apparatus comprising:

an optical disc comprising tracks and wobble signals which form the tracks and include information to access the optical disc; and a modulator provided with a first characteristic of a first modulation method and a second characteristic of a second modulation method, to modulate address information and/or additional information in basic units in which each basic unit is formed with a predetermined nominal wobble length (NWL), and a plurality of information bits are loaded in a basic unit to express information, modulated information being in a form of wobble signals in one of the tracks on the optical disc.

13. The apparatus as claimed in claim 12, wherein the first modulation method is a minimum shift keying (MSK) modulation method.

14. The apparatus as claimed in claim 12, wherein the second modulation method is a harmonic modulated wave (HMW) modulation method.

15. The apparatus as claimed in claim 12, wherein the first characteristic of the first modulation method is physical location information of a minimum shift keying (MSK)-modulated signal.

16. The apparatus as claimed in claim 12, wherein the second characteristic of the second modulation method is sign information of a second harmonic wave obtained by a harmonic modulated wave (HMW) modulation method which synthesizes a cosine function of a basic frequency of the wobble signals with a sine function having a frequency that is a multiple of the basic frequency of the wobble signals.

17. The apparatus as claimed in claim 12, wherein the modulated information is formed as the wobble signals in the tracks so as to increase an amount of the address information and/or additional information in a predetermined space of the disc, and/or access an arbitrary location of the optical disc using smaller data units.

18. The apparatus as claimed in claim 12, wherein the address information and/or additional information are modulated in the basic units into a predetermined number of wobble signals such that an arbitrary location on the optical disc is accessed in the basic units.

* * * * *